(12) United States Patent
Chen

(10) Patent No.: US 7,112,459 B2
(45) Date of Patent: Sep. 26, 2006

(54) THIN FILM TRANSISTOR LIQUID CRYSTAL DISPLAY AND FABRICATION METHOD THEREOF

(75) Inventor: Maw-Song Chen, Taipei (TW)

(73) Assignee: Quanta Display Inc., Tao Yuan Shien (TW)

( * ) Notice: Subject to any disclaimer, the term of this patent is extended or adjusted under 35 U.S.C. 154(b) by 239 days.

(21) Appl. No.: 10/947,747

(22) Filed: Sep. 23, 2004

(65) Prior Publication Data

US 2005/0037528 A1    Feb. 17, 2005

Related U.S. Application Data

(62) Division of application No. 10/647,885, filed on Aug. 25, 2003, now Pat. No. 6,861,671.

(30) Foreign Application Priority Data

Dec. 24, 2002    (TW) .............................. 91137146 A

(51) Int. Cl.
*H01L 21/00* (2006.01)
(52) U.S. Cl. .................. 438/30; 438/149; 438/157; 349/113
(58) Field of Classification Search .............. None
See application file for complete search history.

(56) References Cited

U.S. PATENT DOCUMENTS

| 6,639,639 B1* | 10/2003 | Baek et al. ............... 349/113 |
| 6,654,076 B1* | 11/2003 | Ha et al. .................. 349/43 |
| 6,734,463 B1* | 5/2004 | Ishikawa .................. 257/79 |

* cited by examiner

*Primary Examiner*—Zandra V. Smith
*Assistant Examiner*—Khanh Duong
(74) *Attorney, Agent, or Firm*—Thomas, Kayden, Horstemeyer & Risley

(57) ABSTRACT

A thin film transistor liquid crystal display (TFT-LCD) and fabrication method thereof. The fabrication method includes depositing a first metal layer on a transparent substrate, patterning the first metal layer to form at least two adjacent gate electrodes, forming a gate insulating layer on the gate electrodes, forming a semiconductor layer on the insulating layer, patterning the semiconductor layer into a predetermined shape, depositing a second metal layer on the transparent substrate, patterning the second metal layer to form a source/drain electrode layer, and depositing an insulating layer on the transparent substrate. A contact hole is defined via the insulating layer, source/drain electrode layer, and gate insulating layer, exposing a part of the surface of transparent substrate between the adjacent gate electrodes. A transparent conductive layer is deposited on the transparent substrate, and a light-shielding matrix is formed directly above the contact hole.

10 Claims, 6 Drawing Sheets

THIN FILM TRANSISTOR LIQUID CRYSTAL DISPLAY AND FABRICATION METHOD THEREOF

CROSS-REFERENCE TO RELATED APPLICATIONS

This application is a division of U.S. patent application Ser. No. 10/647,885, filed on Aug. 25, 2003 now U.S. Pat. No. 6,861,671.

BACKGROUND OF THE INVENTION

1. Field of the Invention

The present invention relates to at thin film transistor liquid crystal display (TFT-LCD), and more particularly to a TFT-LCD manufacturing process with fewer photolithography steps.

2. Description of the Related Art

Liquid crystal display (LCD) is a commonly used flat panel display technology. Owing to dielectric anisotropy and conductive anisotropy of liquid crystal molecules, molecular orientation of liquid crystals can be shifted under an external electronic field, such that various optical effects are produced.

An LCD panel is generally made up of two substrates, with a certain gap preserved therebetween, and a liquid crystal layer filled in the gap. Respective electrodes are formed on the two substrates, respectively, to control the orientation and shift of liquid crystal molecules.

A TFT-LCD panel is generally made up of a TFT array substrate and a color filter substrate. The detailed structures are described as follows.

FIGS. 1A–1E are cross-sections showing the conventional manufacturing process of a TFT-LCD. First, as in FIG. 1A, a metal layer of, for example, Mo—Al—Nd is deposited on a transparent substrate 21. The metal layer is then defined to form a gate electrode 22 by photolithography. A gate insulating layer 23 is then formed on the gate electrode 22.

Next, as in FIG. 1B, an insulating layer 24, a first semiconductor layer 25 of, for example, amorphous silicon (a-Si) and a second semiconductor layer 26 of, for example, n+ doped amorphous silicon are deposited on the transparent substrate 21 sequentially. The insulating layer 24, first semiconductor layer 25 and second semiconductor layer 26 are then defined to form an island-shaped structure.

Next, as in FIG. 1C, an Al alloy layer of, for example, Al, Al—Nb, Al—Nd, Al—Ti or Al—Si—Cu is then deposited on the transparent substrate 21. The metal layer is then defined to form a signal line 27 and a source/drain metal layer by photolithography, wherein the source/drain metal layer includes a source electrode 31 and drain electrode 32, with a channel 28, exposing the first semiconductor layer 25, formed therebetween.

Next, as in FIG. 1D, a protective layer 34 is deposited on the transparent substrate 21, covering the TFT element while exposing the contact hole 30, to protect the TFT element from erosion. The protective layer 34 is, for example, a silicon nitride layer.

Next, as in FIG. 1E, an indium tin oxide layer is deposited on the transparent substrate 21. The indium tin oxide layer is then defined to form a signal line area 36 and a pixel area 38.

FIG. 2 is a cross-section of another conventional TFT-LCD, showing the storage capacitor thereof. Manufacturing of the TFT-LCD requires six photolithography steps. First, a first metal layer is deposited on a transparent substrate 50. The first metal layer is then defined to form a gate electrode 52 by a first photolithography step. A gate insulating layer 54 is then formed on the gate electrode 52 and defined by a second photolithography step. A semiconductor layer (not shown) is then formed on the gate insulating layer 54 and defined by a third photolithography step. Next, a second metal layer is deposited on the transparent substrate 50, followed by a fourth photolithography step to form a source/drain metal layer 56. Next, a protective layer 58 and a planarization layer 60 are formed sequentially on the transparent substrate 50, covering the TFT element for protection from erosion. The planarization layer 60 and protective layer 58 are then defined by a fifth photolithography step to form a contact hole. Finally, an indium tin oxide layer 64 is deposited on the transparent substrate 50 and defined by a sixth photolithography step to form a signal line area and a pixel area.

Afterwards, fabrication of a color filter 70 and liquid crystal layer 72 is performed.

Owing to the two steps of contact-hole manufacture, up to six photolithography steps are required, lowering throughput, and increasing costs.

SUMMARY OF THE INVENTION

Accordingly, an object of the present invention is to reduce the number of required photolithography steps in production of a TFT-LCD.

Therefore, the invention provides a TFT-LCD and the fabrication method thereof. The TFT-LCD comprises a transparent substrate provided with at least two adjacent gate electrodes, a gate insulating layer on the gate electrodes, a semiconductor layer in a predetermined shape on the insulating layer, a source/drain electrode layer on a predetermined area of the transparent substrate, and an insulating layer on the source/drain electrode layer. A contact hole is defined via the insulating layer, source/drain electrode layer, and gate insulating layer, exposing a part of the surface of transparent substrate between the adjacent gate electrodes. A transparent conductive layer is on the transparent substrate, and a light-shielding matrix is directly above the contact hole.

The fabrication method of the TFT-LCD comprises depositing a first metal layer on a transparent substrate, patterning the first metal layer to form at least two adjacent gate electrodes, forming a gate insulating layer on the gate electrodes, forming a semiconductor layer on the insulating layer, patterning the semiconductor layer into a predetermined shape, depositing a second metal layer on the transparent substrate, patterning the second metal layer to form a source/drain electrode layer, and depositing an insulating layer on the transparent substrate. A contact hole is defined via the insulating layer, source/drain electrode layer, and gate insulating layer, exposing a part of the surface of transparent substrate between the adjacent gate electrodes. A transparent conductive layer is deposited on the transparent substrate, and a light-shielding matrix is formed directly above the contact hole.

According to the invention, the required photolithography steps are reduced, shortening the manufacturing time, increasing throughput and lowering costs. Meanwhile, the design of forming the gate electrodes on both sides of the contact hole prevents over-etching of the contact hole, protecting the gate electrodes from short-circuiting. In addition, the light-shielding matrix directly above the contact hole prevents light leakage around the contact hole.

DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1A:
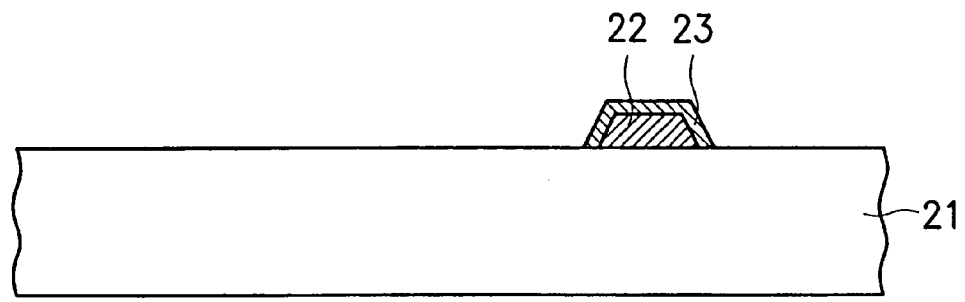
FIGS. 1A–1E are cross-sections showing the conventional manufacturing process of a TFT-LCD.
Figure 1B:
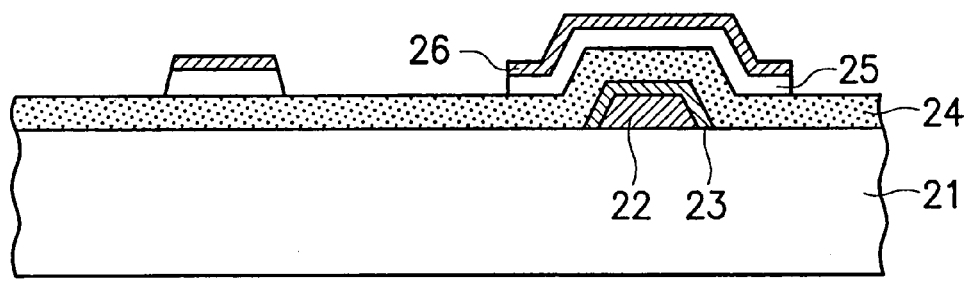
Figure 1C:
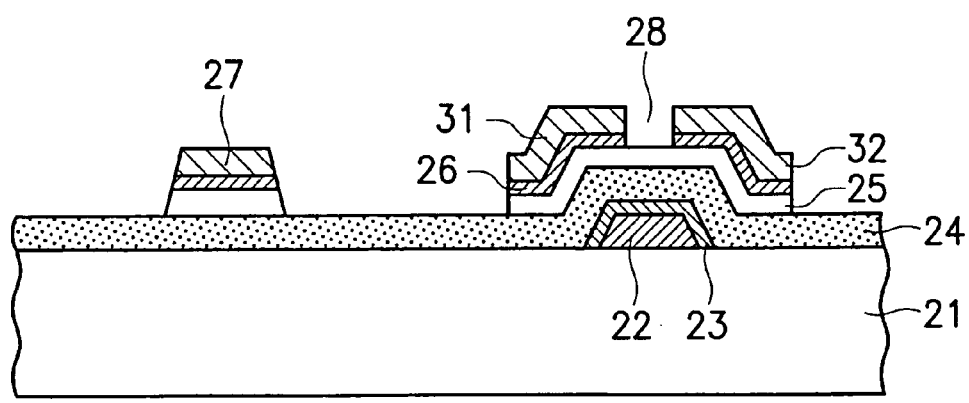
Figure 1D:
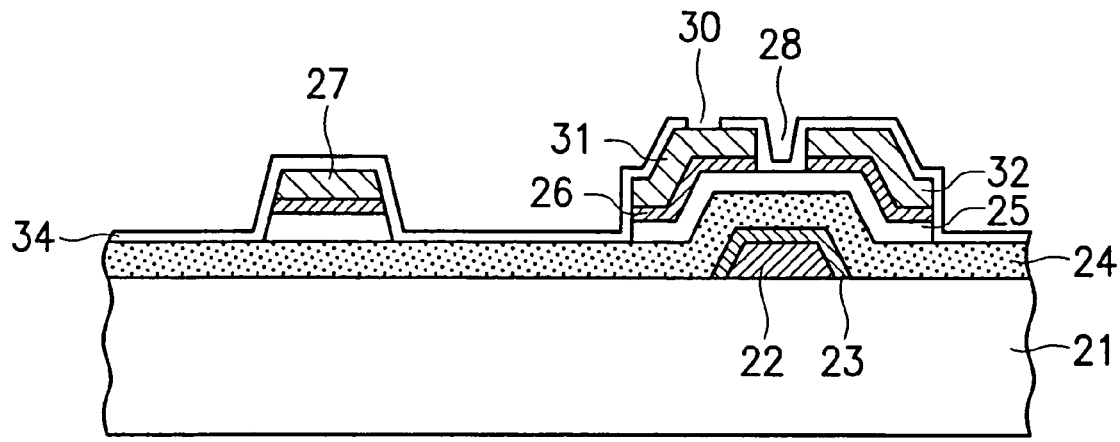
Figure 1E:
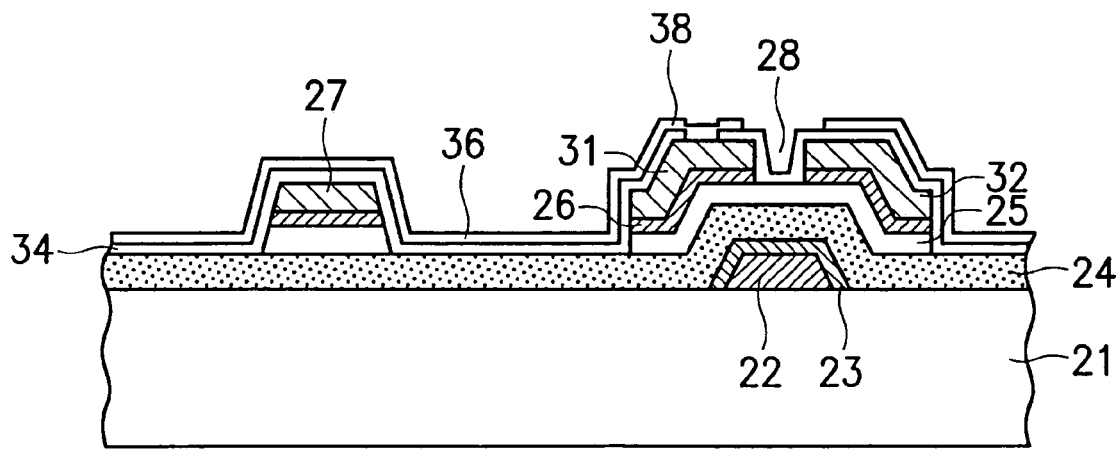
Figure 2:
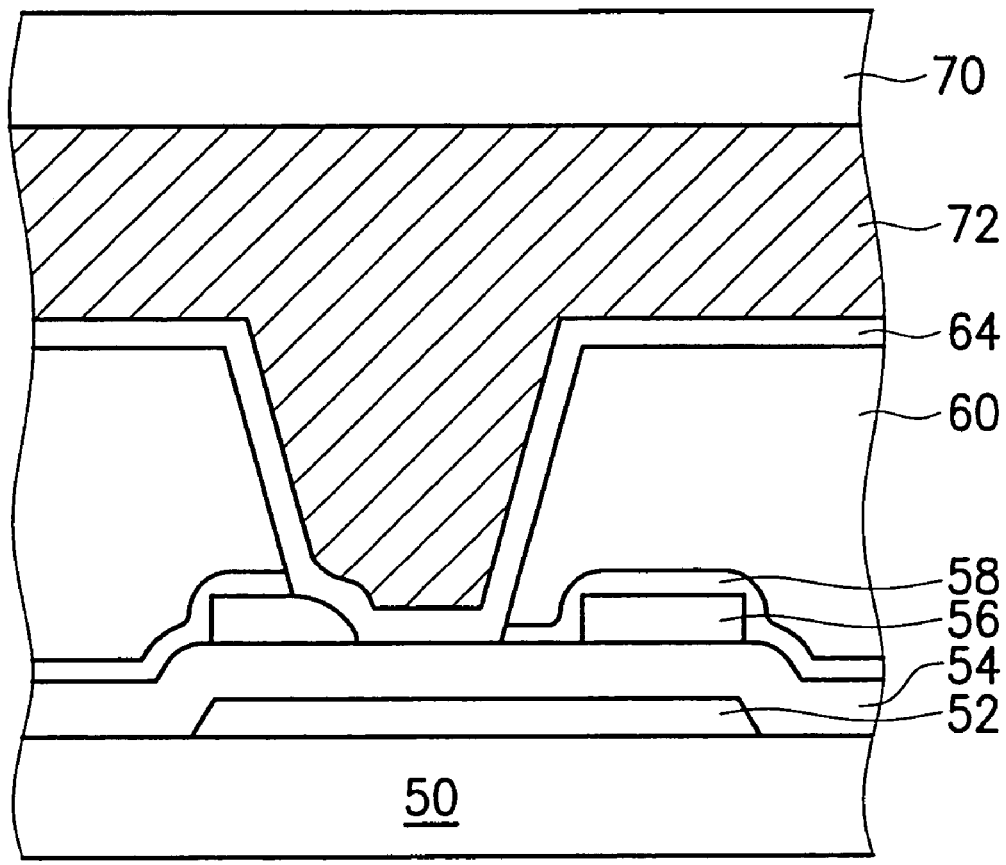
FIG. 2 is a cross-section of a conventional TFT-LCD.
Figure 3:
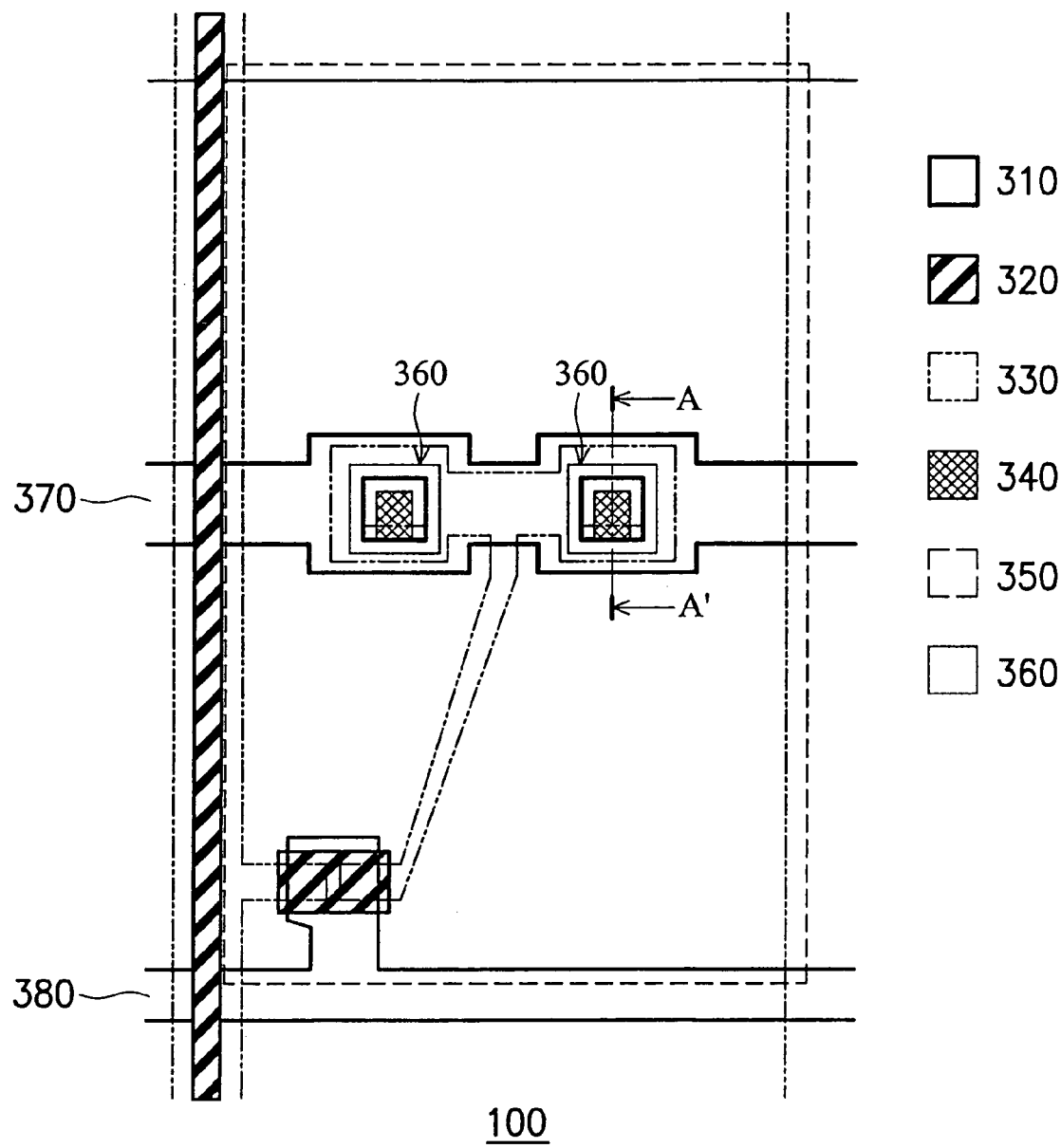
FIG. 3 is a top view of a TFT-LCD in the invention.

FIG. 3 is a top view showing a TFT-LCD in the invention. The TFT-LCD comprises a transparent substrate 100, gate line area 310, n+ doped a-Si layer 320, source/drain electrode area 330, contact-hole area 340, indium tin oxide layer 350, light shielding matrix (black matrix) 360 on a color filter, capacitor line 370, and gate line 380.

FIGS. 4A–4E are cross-sections of the TFT-LCD taken at the line A–A' in FIG. 3, showing the manufacturing process of TFT-LCD in the invention.

Figure 4A:
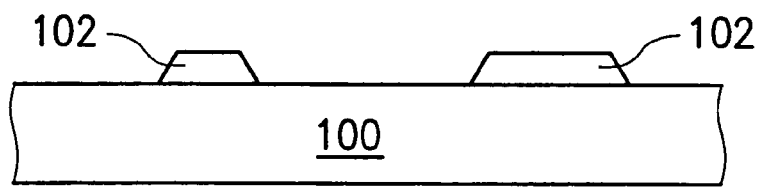
FIGS. 4A–4E are cross-sections of the TFT-LCD taken at the line A–A' in FIG. 3, showing the manufacturing process of TFT-LCD in the invention.

First, as in FIG. 4A, a first metal layer of, for example, Mo—Al—Nd alloy is deposited on a transparent substrate 100, and then defined by a first photolithography step to form gate electrodes 102.

Figure 4B:
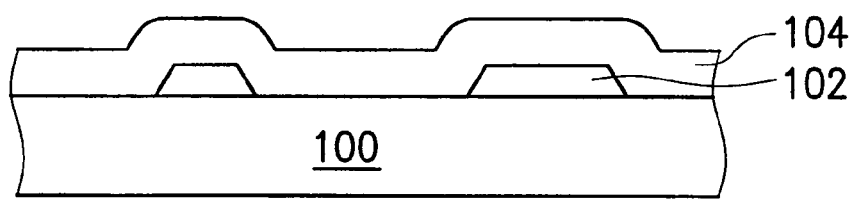

Next, as in FIG. 4B, a gate insulating layer 104 is formed on the gate electrodes 102. For example, an oxide layer is formed on the gate electrodes 102 by chemical vapor deposition (CVD). Next, a semiconductor layer (not shown) of, for example, n+ doped a-Si is formed on the gate insulating layer 104, and then defined by a second photolithography step.

Figure 4C:
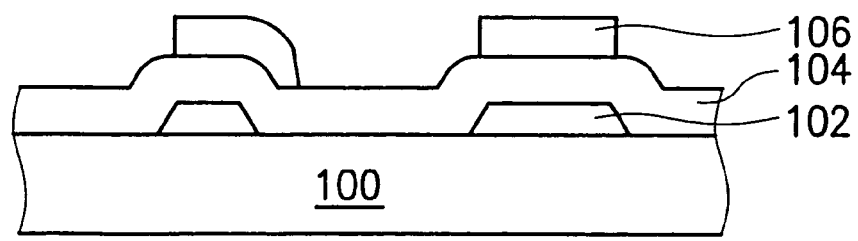

Next, as in FIG. 4C, a second metal layer of, for example, Al, Al—Nb, Al—Nd, Al—Ti or Al—Si—Cu is deposited on the transparent substrate 100, and then defined by a third photolithography step to form a source/drain electrode layer 106.

Figure 4D:
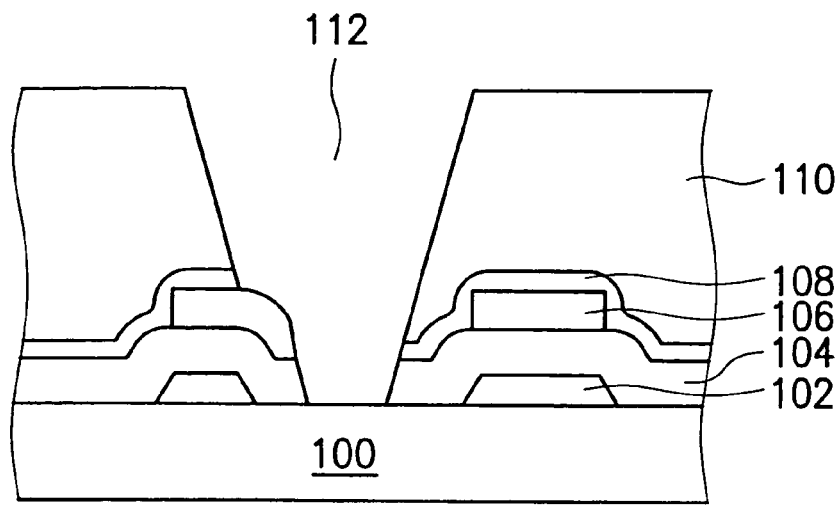

Next, as in FIG. 4D, insulating layers, for example, a protective layer 108 and a planarization layer 110 are formed on the transparent substrate 100 sequentially, covering the TFT elements to protect them from erosion. The protective layer 108 is, for example, an oxide or nitride layer formed by chemical vapor deposition. The planarization layer 110 is, for example, an oxide layer formed by chemical vapor deposition. Next, the planarization layer 110, protective layer 108, source/drain electrode layer 106 and the gate insulating layer 104 are defined by a fourth photolithography step to form a contact hole 112 between two adjacent gate electrodes 102, separated from the two gate electrodes.

Figure 4E:
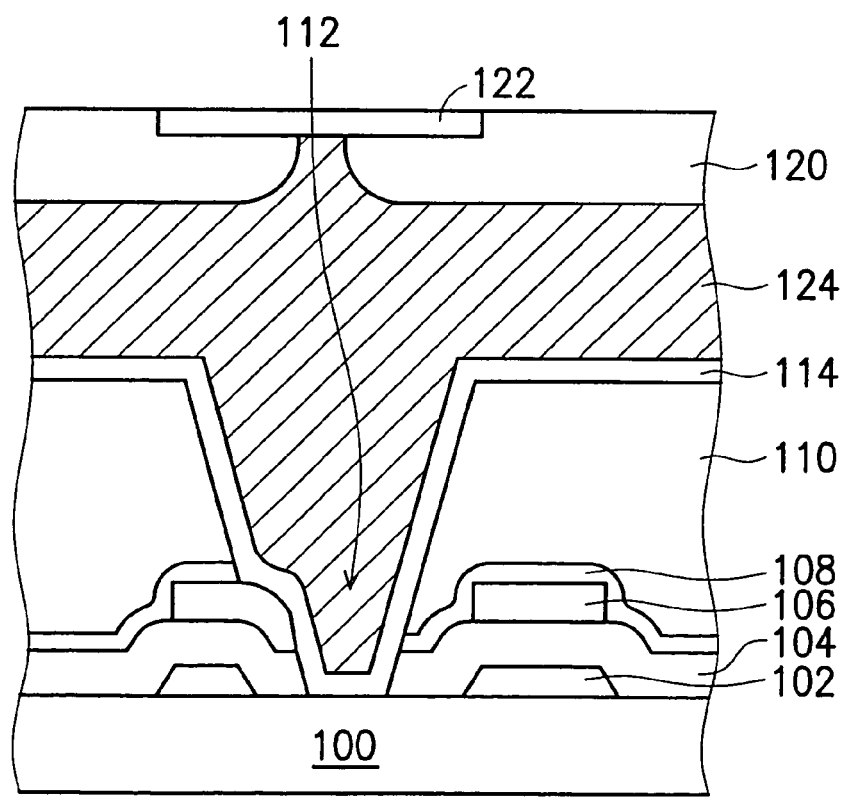

Next, as in FIG. 4E, a transparent conductive layer 114 of, for example, indium tin oxide is deposited on the transparent substrate 100, and then defined by a fifth photolithography step to form a signal line area and a pixel area.

As shown in FIG. 4E, the TFT-LCD in the invention further comprises a color filter 120 provided a predetermined distance above the transparent substrate 100. A light-shielding matrix area 122 is disposed on the color filter 120, directly above the contact hole 112, whereby light leakage around the edge domain is prevented. Next, a liquid crystal layer 124 is filled between the color filter 120 and the transparent substrate 100.

Thus, the TFT-LCD of the embodiment comprises a transparent substrate 100 provided with at least two adjacent gate electrodes 102, a gate insulating layer 104 on the gate electrodes 102, a predetermined-shaped semiconductor layer (not shown) on the gate insulating layer 104, a source/drain electrode layer 106 on a predetermined area of the transparent substrate 100, a protective layer 108 and a planarization layer 110 on the source/drain electrode layer 106, a contact hole 112 via the protective layer 108, planarization layer 110, source/drain electrode layer 106 and gate insulating layer 104, exposing a part of the surface of transparent substrate 100, an indium—tin oxide layer 114 on the transparent substrate 100, and a light-shielding matrix 122 directly above the contact hole 112.

According to the invention, in the step of etching the protective layer 108 to form a contact hole 112, the source/drain electrode layer 106 and the gate insulating layer 104 are etched together with the protective layer 108 in a single photolithography step, and the step of defining the gate insulating layer 104 is, therefore, eliminated.

According to the invention, the required photolithography steps are reduced, shortening manufacturing time, increasing throughput and lowering costs. Meanwhile, the design of forming the gate electrodes on both sides of the contact hole prevents over-etching of the contact hole, protecting the gate electrodes from short circuit. In addition, the light-shielding matrix directly above the contact hole prevents light leakage around the contact hole.

The foregoing description has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A method of fabricating a thin film transistor-LCD, comprising:

depositing a first metal layer on a transparent substrate;

patterning the first metal layer to form at least two adjacent gate electrodes;

forming a gate insulating layer on the gate electrodes;

forming a semiconductor layer on the insulating layer;

patterning the semiconductor layer into a predetermined shape;

depositing a second metal layer on the transparent substrate;

patterning the second metal layer to form a source/drain electrode layer;

depositing an insulating layer on the transparent substrate;

defining a contact hole via the insulating layer, source/drain electrode layer, and gate insulating layer, exposing a part of the surface of transparent substrate between the adjacent gate electrodes;

depositing a transparent conductive layer on the transparent substrate; and forming a light-shielding matrix directly above the contact hole.

2. The method as claimed in claim 1, wherein the gate electrode is a Mo—Al—Nd electrode.

3. The method as claimed in claim 1, wherein the source/drain electrode layer is an Al, Al—Nb, Al—Nd, Al—Ti or Al—Si—Cu layer.

4. The method as claimed in claim 1, wherein the gate insulating layer is an oxide layer formed by chemical vapor deposition.

5. The method as claimed in claim 1, wherein the insulating layer is an oxide or nitride layer formed by chemical vapor deposition.

6. The method as claimed in claim 1, further comprising a step of providing a color filter a predetermined distance above the transparent substrate, wherein the light-shielding matrix directly above the contact hole is disposed on the color filter.

7. The method as claimed in claim 1, wherein the gate electrodes are separated from the contact hole.

8. A method of fabricating a thin film transistor-LCD, comprising:
   depositing a first metal layer on a transparent substrate;
   patterning the first metal layer to form at least two adjacent gate electrodes by photolithography;
   forming a gate insulating layer on the gate electrodes;
   forming a semiconductor layer on the insulating layer;
   patterning the semiconductor layer into a predetermined shape by photolithography;
   depositing a second metal layer on the transparent substrate;
   patterning the second metal layer to form a source/drain electrode layer by photolithography;
   depositing an insulating layer on the transparent substrate;
   defining a contact hole by photolithography, separated from the gate electrodes, via the insulating layer, source/drain electrode layer, and gate insulating layer, exposing a part of the surface of transparent substrate between the adjacent gate electrodes;
   depositing an indium tin oxide layer on the transparent substrate;
   providing a color filter a predetermined distance above the transparent substrate, having a light-shielding matrix directly above the contact hole.

9. The method as claimed in claim 8, wherein the gate electrode is a Mo—Al—Nd electrode; the source/drain electrode layer is an Al, Al—Nb, Al—Nd, Al—Ti or Al—Si—Cu layer.

10. The method as claimed in claim 8, wherein the gate insulating layer is an oxide layer and the insulating layer is an oxide or nitride layer formed by chemical vapor deposition.

* * * * *